UNITED STATES PATENT OFFICE 2,005,041

6-METHOXY-6'-ETHOXYTHIOINDIGO

Carl Krauss and Walter Brunner, Frankfort-on-the-Main-Fechenheim, Germany, assignors to General Aniline Works, Inc., New York, N. Y., a corporation of Delaware No Drawing. Application August 2, 1934, Serial No. 738,138. In Germany August 25, 1933

1 Claim. (Cl. 260—53)

Our invention relates to an asymmetrical dyestuff of the thioindigo series, i. e. the 6-methoxy-6'-ethoxythioindigo.

Whereas the well known 6,6'-diethoxy-thioindigo dyes cotton by dyeing and printing processes a brilliant reddish orange, the 6,6'-dimethoxy-thioindigo yields substantially more yellowish and dark shades. In spite of its increased fastness to light it is of no technical importance owing to its entirely insufficient fastness to boiling soap solutions.

Our present invention is based on the discovery that in a surprising manner the 6-methoxy-6'-ethoxy-thioindigo of the formula:

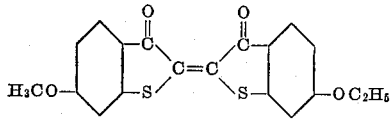

which is obtainable according to the known methods exhibits on the one hand a sufficient fastness to boiling soap solutions and on the other hand a fastness to light equal to that of the dimethoxy-thioindigo. The asymmetrical dyestuff is further distinguished by a surprising shade. Whereas a shade lying between that of the two symmetrical dyestuffs was to be expected, in fact the 6-methoxy-6'-ethoxy-thioindigo dyes substantially more reddish shades than those of the diethoxythioindigo.

The new dyestuff is suitable for the usual dyeing and printing processes. Advantageously it may be used in the form of the ester salts of its leuco-compound.

In order to further illustrate our invention the following example is given, the parts being by weight and all temperatures in centigrade degrees; but we wish it, however, to be understood that our invention is not limited to the particular products nor reacting conditions mentioned therein:—

Example 32.6 parts of 6-ethoxy-2,3-diketo-dihydro-thionaphthene-2-(p-dimethyl-amino)-anil are mixed with 18 parts of 6-methoxy-3-oxythionaphthene and about 400 parts of chlorobenzene and the mixture is heated for about 2 hours at 115–120° C. When cool the dyestuff is isolated in the customary manner. It dissolves in concentrated sulfuric acid with a blue color and dyes vegetable fibers from a yellow vat bright reddish orange shades.

The same dyestuff is obtained by condensing the 2-anil of the 6-methoxy-2,3-diketo-dihydro-thionaphthene with 6-ethoxy-3-oxythionaphthene.

We claim:—

The 6-methoxy-6'-ethoxy-thioindigo of the formula:

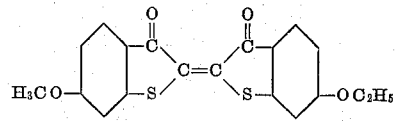

which dyestuff dissolves in concentrated sulfuric acid with a blue color and dyes vegetable fibers from a yellow vat bright reddish orange shades of a good fastness to light and boiling soap solutions.

CARL KRAUSS.
WALTER BRUNNER.